United States Patent [19]
Falbel

[11] Patent Number: 6,019,319
[45] Date of Patent: *Feb. 1, 2000

[54] MOMENTUM WHEEL ENERGY STORAGE SYSTEM USING MAGNETIC BEARINGS

[76] Inventor: Gerald Falbel, 472 Westover Rd., Stamford, Conn. 06902

[ * ] Notice: This patent issued on a continued prosecution application filed under 37 CFR 1.53(d), and is subject to the twenty year patent term provisions of 35 U.S.C. 154(a)(2).

[21] Appl. No.: 08/598,346

[22] Filed: Feb. 8, 1996

[51] Int. Cl.$^7$ ..................................................... B64G 1/28
[52] U.S. Cl. ............................ 244/165; 310/74; 310/90.5
[58] Field of Search .................................. 244/165, 173; 74/5.6 E, 5.46; 310/90.5, 74

[56] References Cited

U.S. PATENT DOCUMENTS

| | | |
|---|---|---|
| 4,483,570 | 11/1984 | Inoue . |
| 4,723,735 | 2/1988 | Eisenhaure et al. ..................... 244/165 |
| 4,735,382 | 4/1988 | Pinson ..................................... 244/165 |
| 4,949,922 | 8/1990 | Rosen ...................................... 244/173 |
| 5,248,239 | 9/1993 | Andrews . |
| 5,337,981 | 8/1994 | Bender .................................... 244/165 |
| 5,469,008 | 11/1995 | Nakajima et al. . |
| 5,520,359 | 5/1996 | Merhav et al. ......................... 244/173 |
| 5,611,505 | 3/1997 | Smay ....................................... 244/165 |
| 5,633,547 | 5/1997 | Coombs . |

FOREIGN PATENT DOCUMENTS

| | | | |
|---|---|---|---|
| 180118 | 1/1984 | Japan .................................... | 310/90.5 |

Primary Examiner—Charles T. Jordan
Assistant Examiner—Tien Dinh
Attorney, Agent, or Firm—Mark P. Stone

[57] ABSTRACT

A momentum wheel energy storage system employs a semi-passive magnetic bearing. The system provides advantages over chemical electrical storage batteries including enhanced storage life. The use of passive permanent magnetic bearings for radial control in combination with active axial control results in a flywheel energy storage system which eliminates several components of conventional flywheel energy storage systems. The energy storage system can be employed in orbiting spacecraft to provide the dual functions of storage of energy from a spacecraft solar collector and control of spacecraft attitude and attitude stabilization.

11 Claims, 3 Drawing Sheets

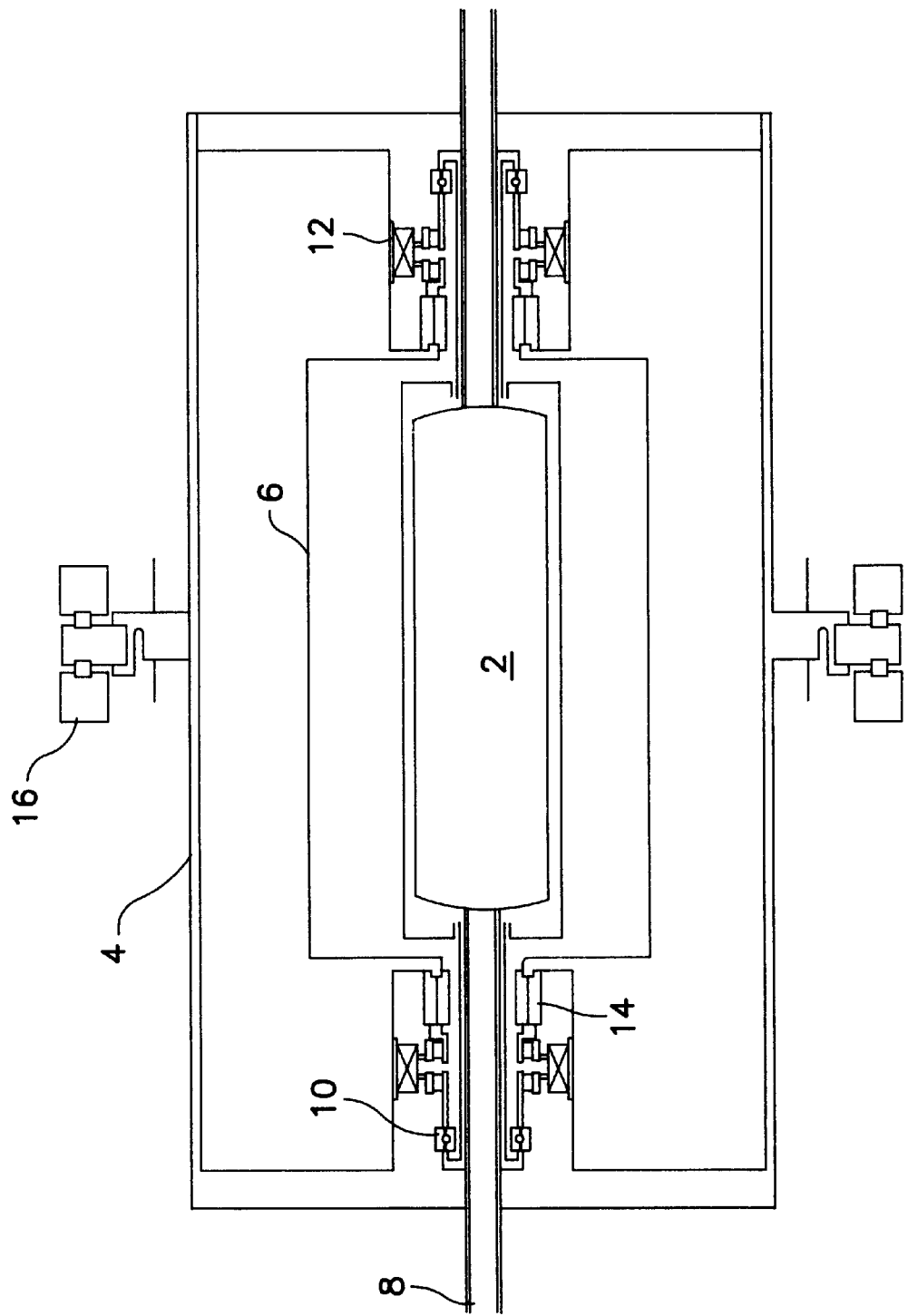
FIG. I

MOMENTUM WHEEL ENERGY STORAGE SYSTEM USING MAGNETIC BEARINGS

The present invention is directed to a semi-passive magnetic bearing system applicable to energy storage flywheels, suitable for the replacement of batteries in electric automobiles, or other electrical energy storage applications.

The same system can also be applied to spacecraft attitude stabilization components, such as attitude reaction wheels, which can also perform the function of non-degrading mechanical batteries, replacing the finite life chemical batteries.

The primary object of the present invention is the simplification of the electronic parts count presently required to achieve magnetic bearing suspension systems.

Magnetic bearings are the key components necessary to achieve high rotational speeds without wear while minimizing friction, thus achieving indefinite operational life, and high storage efficiency for flywheels. Flywheel electrical storage systems are likely to become the predominant energy storage means for electric automobiles because of their many advantages over chemical batteries. The advantages of flywheel electrical storage systems over chemical batteries include light weight, high efficiencies, rapid recharge rate, high peak power output capabilities, and indefinite life spans. The rapidly expanding interest in the field of electric automobiles is being spurred by environmental considerations.

Magnetic bearings are currently available from several manufacturers, including AVCON, of Agoura Hilla Calif. A typical magnetic bearing system uses 5 control loops to "levitate" the bearing shaft: two for radial control of the front bearing, two for radial control of the rear bearing, and one for axial control.

In accordance with a primary object of the present invention, four of five control loops of a magnetic bearing system are eliminated by using passive, permanent magnetic bearings to achieve the radial control, while retaining a single channel for active axial control, which also provides magnetic reluctance centering radial stabilization approximately 2.5 times stronger than passive magnetic bearings alone, with no additional electronic complexity. This reduces the electronic parts cost by a ratio of 5:1, increases the reliability by this same factor, and reduces the quantity cost by almost this same factor, thus achieving a major step toward the goal of achieving a cost effective flywheel energy storage system.

Some limitations are inherent to this passive radial stabilization approach. Such a bearing system has significantly less radial stiffness than active magnetic suspensions, and therefore would be inapplicable where tight radial runout control is necessary, such as in machine tools, etc. In the application of this approach to energy storage flywheels, this limitation is not necessarily a predominant consideration, and the advantages of simplicity and lower cost outweigh this limitation. The reduced radial stiffness of the passive magnetic suspension also has implications in applications in moving vehicles, which produce lateral accelerations.

BRIEF DESCRIPTION OF THE DRAWINGS

FIG. 1 of the drawing illustrates a magnetic bearing energy storage flywheel in accordance with one embodiment of the present invention;

Figure 2A:
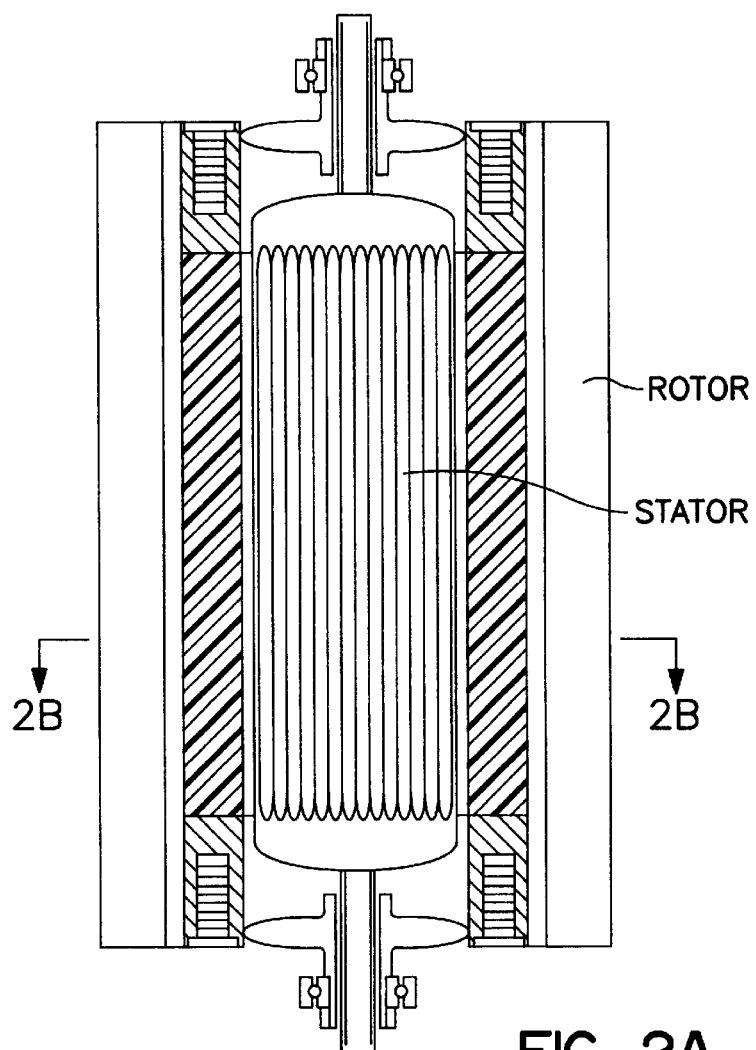
FIG. 2A illustrates a longitudinal section through a known flywheel using high speed ball bearings.

The original concept for the bearing system which is the subject of the present invention, was to develop an all-passive permanent magnetic bearing system. A feasibility model was fabricated. This model, which used existing permanent magnet rotor and stator elements, conclusively confirmed Earnshaw's Law (formulated in 1839) which states that passive magnetic levitation about more than two axes is physically impossible. (Livermore Laboratories scientists have recently stated that they have experimentally countervailed Earnshaw's Law with an all passive three axis magnetic suspension system, but this is still in very early development).

The feasibility model was subsequently modified to provide mechanical axial stabilization and it successfully proved the feasibility of radial stabilization by passive permanent magnet means only. However, the radial sectors of permanent magnets produced significant "magnetic slot lock", so that the radially suspended rotor would not spin freely over a greater angle than one of the magnetic sectors.

In order to eliminate this "magnetic slot lock", cylindrical, single piece permanent magnets, were developed through custom design. These cylindrical, axially polarized permanent magnets will be used in the magnetic bearing energy storage flywheel shown in FIG. 1. This drawing illustrates a flywheel energy storage system with a semi-passive magnetic bearing suspension. A stator 2 is centrally disposed within an evacuated housing 4, and a coolant tube 8 (necessary for high energy applications) extends longitudinally through the housing and is coupled to said stator. A rotor 6 is rotatably mounted for rotation around the stator. A pair of catcher ball bearings, active magnetic thrust bearings 10 with reluctance centering 12, and permanent magnetic radial stabilization means 14 are disposed within the housing and are operatively associated with the rotor. The system illustrated by FIG. 1 further includes a two axis free gimbal 16 for maintaining spin axis vertical in a moving vehicle.

Figure 2B:
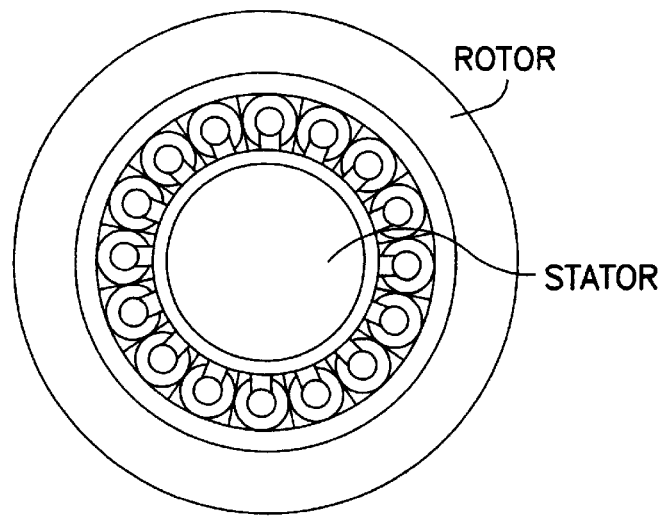
FIG. 2B illustrates a cross section of the known flywheel as seen through directional arrows 2B—2B.

The design parameters of the flywheel were based upon an existing product, available "off-the-shelf" from Trinity Flywheels Batteries Inc. of San Francisco, Calif. This flywheel provides an energy storage of 1 Kilowatt-hour, and can provide 400 amps of peak output current, which is equivalent to 60 hp. at an output voltage of 120 volts. One of the existing Trinity units (shown in FIGS. 2A and 2B) uses special high speed ball bearings, which can operate up to the flywheel's maximum speed of 80,000 rpm. These special high speed bearings will be used as "catcher" bearings in the proposed prototype to contain excessive radial runout in the magnetic suspension system, in the unlikely event that it occurs.

Figure 3:
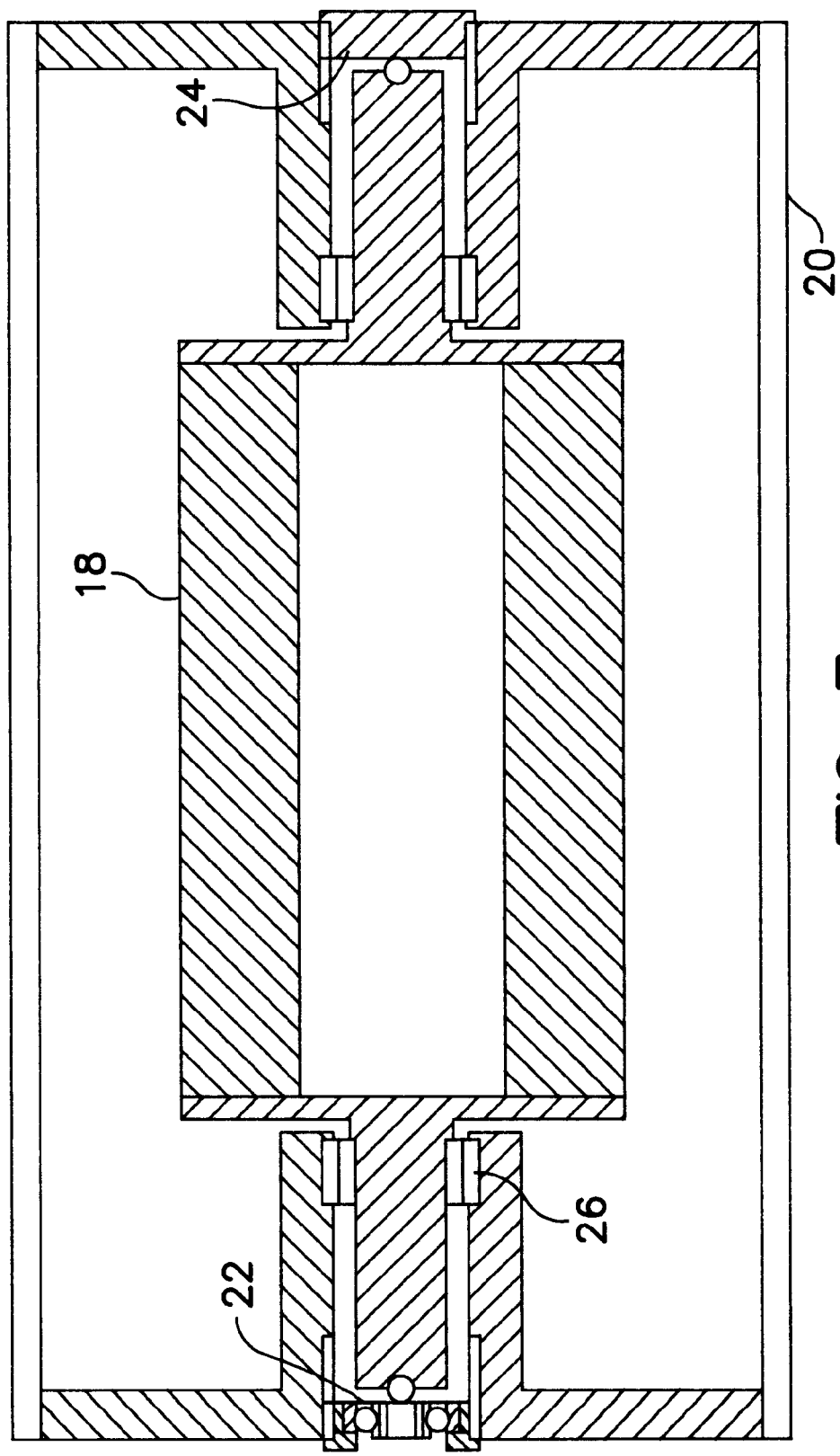
FIG. 3 illustrates a motorless magnetic bearing energy storage flywheel in accordance with a further embodiment of the present invention.

In accordance with the invention, a "breadboard" model of the rotor of the Trinity Flywheel, as is shown in FIG. 3, has been fabricated. This motorless model will be used to verify the static and dynamic radial stabilization parameters of the permanent magnets alone, using mechanical ball/plate axial stabilization. The motorless flywheel illustrated by FIG. 3 includes a rotor 18 rotatably mounted in a housing 20, a ball bearing endplate 22 with keyway holes for remote rotor drive disposed towards one end of the rotor, a stainless steel ball and plate 24 for axial stabilization disposed towards the opposed end of the rotor, and permanent magnet radial stabilization means 26 operatively associated with the rotor.

In addition to the aforementioned uses of the magnetic bearing flywheel system discussed above, a further category of uses for these machines includes a combined spacecraft attitude correction device to generate torque on a spacecraft in orbit, as well as an energy storage system to replace the chemical electrical storage batteries presently used in spacecraft. In this spacecraft application, two energy storage wheels are arranged to spin in opposite directions in a spacecraft, with their spin axes parallel to each other and also orthogonal to the orbit plane of the spacecraft. As the spacecraft solar energy panels collect solar electricity, this electric energy is stored in these wheels by increasing the rotational speed of the spinning wheels. At the same time, the spacecraft attitude about the spin axes of the wheels is controlled by causing one wheel to accelerate faster than the other wheel by directing more of the solar collected electricity to the wheel to be rotated at a higher rotational speed. When the spacecraft is in the earth's shadow, energy is withdrawn from these wheels, which then act as generators, and the attitude of the spacecraft is controlled by withdrawing a different quantity of electrical energy from each of the wheels, which causes differential braking torques on the wheels and thus produces the required attitude correction to the spacecraft. The advantages of this system include:

1. The wheels provide an energy storage function for an indefinite life without degradation with time applicable to chemical batteries.
2. The wheels further provide a second function of attitude stabilization, thereby reducing reliability, and saving costs.
3. The gyroscopic action of the high speed wheels provide additional attitude stabilization from torque perturbations in orbit.
4. The passive radial stabilization magnetic bearings provide automatic caging during the launch vibration, since when power is off, these bearings offset the heavy rotor axially and press it firmly into a radial and axial caging conical surface, thus preventing the rotor from damaging itself or damaging the magnetic suspension system or the catcher bearings during launch vibration of the spacecraft.

Other objects and advantages of the present invention will become apparent to those skilled in the art. Accordingly, the description of the preferred embodiments of the invention discussed herein is intended to be illustrative only and not restrictive of the scope of the invention, that scope being defined by the following claims and all equivalents thereto.

I claim:

1. A spacecraft momentum wheel energy storage and attitude correction device, said device operatively associated with solar panel collector means on said spacecraft, said device comprising two energy storage wheels arranged to rotate in opposite directions, and means for increasing the rotational speed of said two wheels in response to energy collected by said solar collector means for storing electrical energy in said rotating wheels, each of said two energy storage wheels comprising a semi-passive magnetic bearing suspension system.

each semi-passive magnetic bearing suspension system comprising permanent magnet radial stabilization means operatively associated with each of said wheels, each of said wheels comprising a rotor mounted in a housing for relative rotation around a stator in said housing, and active magnetic thrust bearing means for centering said rotor in said housing, said active thrust bearing means being operatively associated with said permanent magnet radial stabilization means, said permanent magnet radial stabilization means adapted to provide automatic caging by applying a force for displacing said rotor into a caging surface protecting said rotor when power is not being supplied to said active magnetic thrust bearing means and said rotor is not centered in said housing.

2. The system as claimed in claim 1 further including means for causing one of said wheels to rotate at a speed greater than the other of said wheels by applying a larger quantity of energy from said solar collector means to said one wheel than to said other wheel.

3. The system as claimed in claim 1 wherein said spin axes of said two wheels are parallel to each other.

4. The system as claimed in claim 3 wherein said spin axes of said two wheels are orthogonal to an orbit plane of said spacecraft.

5. The system as claimed in claim 1 further including means for controlling the attitude of said spacecraft about the spin axes of said two wheels, said means for controlling the attitude including means for causing one of said wheels to rotate at a faster rate than the other of said wheels.

6. The system as claimed in claim 11 further including means for withdrawing energy from said two wheels when said spacecraft is in the earth's shadow.

7. The system as claimed in claim 1 further including means for withdrawing electrical energy stored in at least one of said two rotating wheels.

8. The system as claimed in claim 1 including means for controlling the attitude of said spacecraft by withdrawing different quantities of electrical energy stored in said two rotating wheels for causing differential braking torques on said two rotating wheels for producing attitude correction to said spacecraft.

9. The system as claimed in claim 1 wherein said spin axes of said two wheels are both parallel to each other and orthogonal to an orbit plane of said spacecraft.

10. The device as claimed in claim 1 wherein said caging surface is conical.

11. The device as claimed in claim 10 wherein said conical caging surface includes a radial component and an axial component.

* * * * *

UNITED STATES PATENT AND TRADEMARK OFFICE
CERTIFICATE OF CORRECTION

PATENT NO. : 6,019,319
DATED : February 1, 2000
INVENTOR(S) : Gerald Falbel

It is certified that error appears in the above-identified patent and that said Letters Patent is hereby corrected as shown below:

Column 4, Line 2: Delete ".", and substitute - -,- -.

Column 4, Line 3: Delete "each", and substitute - -said- -.

Column 4, Line 34: (Claim 6, line 1): Delete "claim 11", and substitute - -claim 1- -.

Signed and Sealed this

Twenty-sixth Day of September, 2000

Attest:

Q. TODD DICKINSON

Attesting Officer    Director of Patents and Trademarks